Figure 1:
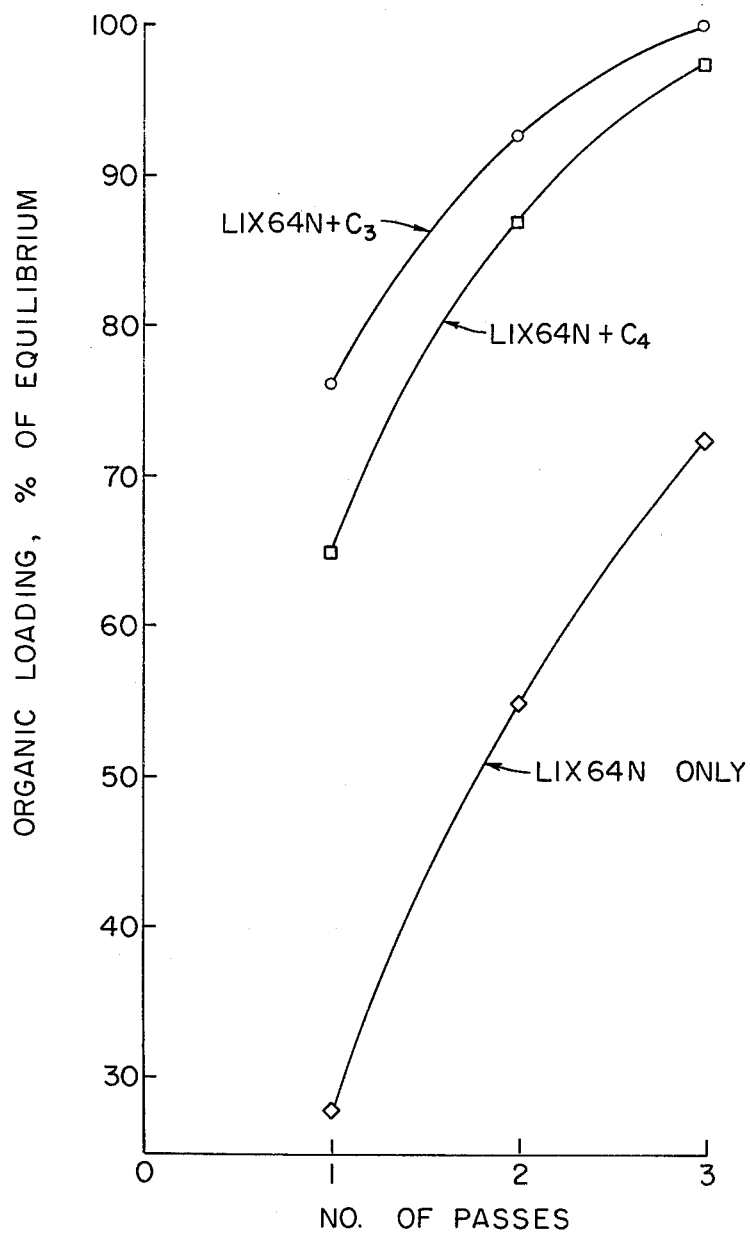

United States Patent [19]
Goren et al.

[11] 3,927,169
[45] Dec. 16, 1975

[54] ION EXCHANGE PROCESS FOR THE RECOVERY OF COPPER

[75] Inventors: Mayer B. Goren, Denver; Enzo L. Coltrinari, Arvada, both of Colo.

[73] Assignee: Hazen Research, Inc., Golden, Colo.

[22] Filed: Mar. 11, 1974

[21] Appl. No.: 450,058

[52] U.S. Cl. .............. 423/24; 75/101 BE; 252/182
[51] Int. Cl.² ........................................... C01G 3/00
[58] Field of Search .......... 423/24; 75/101 BE, 117; 260/438.1, 526.5, 539

[56] References Cited
UNITED STATES PATENTS

| | | | |
|---|---|---|---|
| 2,475,350 | 7/1949 | Carson | 260/438.1 |
| 2,567,023 | 9/1951 | Morway et al. | 260/526.5 |
| 2,812,345 | 11/1957 | Westfahl | 260/526.5 |
| 3,428,449 | 2/1969 | Swanson | 75/117 |
| 3,666,446 | 5/1972 | Cook et al. | 75/117 |
| 3,810,827 | 5/1974 | Kane et al. | 75/101 BE |

*Primary Examiner*—Oscar R. Vertiz
*Assistant Examiner*—Brian E. Hearn
*Attorney, Agent, or Firm*—Sheridan, Ross & Fields

[57] ABSTRACT

A process for recovering copper values from an acidic aqueous medium which comprises contacting the medium with an organic solvent having dissolved therein a copper extraction reagent comprising a 2-hydroxy benzophenoxime or mixtures thereof and as an extraction accelerating agent therefor an α-halo carboxylic acid or a thioglycolic acid or oxidation product of the latter. The invention includes the compositions comprised of 2-hydroxy benzophenoximes and the copper extraction accelerating agents.

17 Claims, 2 Drawing Figures

EFFECT OF REAGENT $C_3$ AND $C_4$ ADDITION TO 10% LIX64N ON COPPER EXTRACTION RATE

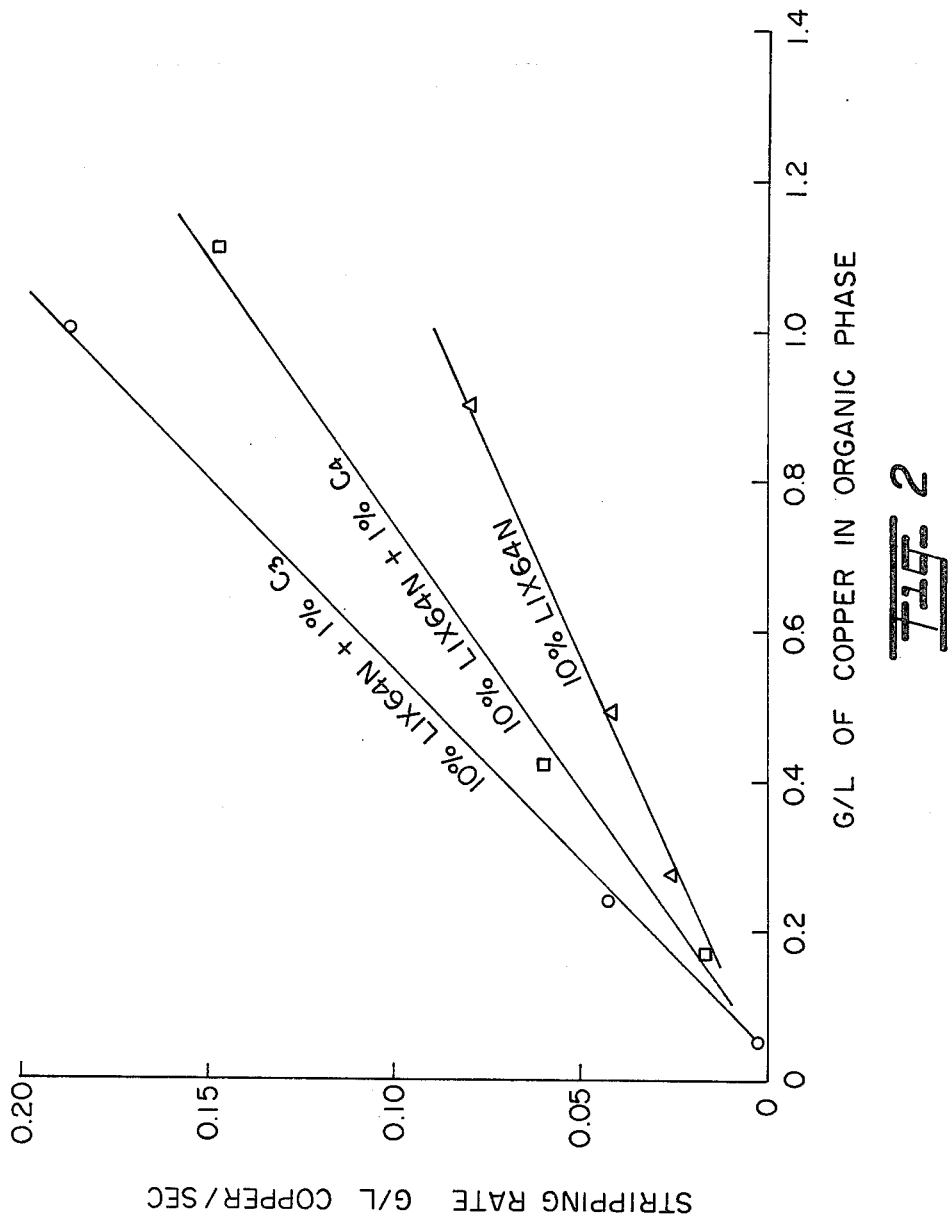

ION EXCHANGE PROCESS FOR THE RECOVERY OF COPPER

BACKGROUND OF THE INVENTION

The solvent extraction process is finding increasing application in the field of extractive metallurgy. It is commercially used for the recovery of uranium, copper, tungsten, molybdenum, rare earths, beryllium, and other metals. Its wide application is because of the availability of organic solvents with specifically selective properties for a given element. The specific organic solvent can be used to extract from an aqueous solution and purify one metal element from a mixture containing many contaminants.

The most recent wide use of solvent extraction is for the recovery of copper from dilute sulfuric acid solutions such as those obtained by leaching a copper oxide ore. This use has been made possible principally by the development of specifically copper selective solvents such as the extractants sold by Ashland Chemical Co. under the trade name Kelex, and those sold by General Mills Co. under the trade names, LIX 63, LIX 64, LIX 64N and LIX 70, the latter three including substituted 2-hydroxy benzophenoximes as the active extractant.

The copper selective solvent sold under the trade name LIX 63, an alpha hydroxy oxime, is not operative in solutions of the acidity normally encountered in acid leaching while certain other types such as the sulfonates and organo phosphates are non-selective and thus have no present use in copper recovery.

The equipment for the application of solvent extraction to extractive metallurgy has usually consisted of multiple stage counter-current mixer-settler systems in which the barren organic solvent and the pregnant aqueous stream (usually a leach liquor) are mixed together for a given period of time after which they are permitted to separate in a settling reservoir. The solvent and aqueous then flow in opposite directions to the next stage of contact.

During the mixing step in conventional systems for copper recovery, the driving force for the transfer of the copper from the aqueous to the organic phase (or in the case of stripping, the transfer from the organic to the aqueous phase) depends upon the difference in concentration of copper in the aqueous and the organic phases. If agitated long enough, eventually a chemical equilibrium is achieved and no further transfer of copper takes place between the aqueous and the organic. The concentrations at which equilibrium is reached will be dependent on the ion exchange agent, the acidity of the solution, temperature, etc. In order to achieve maximum efficiency in the system, it is highly desirable to have each mixer come as close as possible to this chemical equilibrium before the material leaves the mixer and flows to the settling tanks.

The size of the mixing equipment which is required to achieve chemical equilibrium within a given time will depend fundamentally on the extraction rate of the particular ion exchange agent being used. It is known that those ion exchange agents which have been developed specifically for the extraction of copper are much slower in their extraction rate than is the ion exchange agent used specifically for extraction of some other metals, as for example, uranium. The extraction of uranium with a tertiary amine in acid solution of pH 1.5 is very fast, a matter of seconds, whereas the extraction of copper from acid solution of that pH by LIX 64, (a 2-hydroxy substituted benzophenoxime) is quite slow, commonly requiring as long as 4 minutes to reach equilibrium in a batch agitated system at room temperature. Because the solution flow rates in a copper leaching plant are very large, the size of the mechanically agitated vessels required for a mixing system to contain and mix the required solvent and aqueous for this long a time are large and expensive. In addition, in a continuous mixing system it is not possible to achieve the true chemical equilibrium that is achieved when materials are agitated in a batch. This is because of the well known phenomenon of short circuiting. In fact, as a practical matter, a mixer designed for continuous copper extraction is calculated on the basis of only 80 percent of the extraction equilibrium that would be achieved in a batch tank having the same residence time.

The dollar value per unit volume of a copper leach solution containing a few grams per liter of copper is very low, thus the capital investment for an appropriate mixing system is quite high for the amount of copper which is being treated. The depreciation costs, therefore, per pound of copper are high and this diminishes the value of the solvent extraction process for the copper industry. Further contributing to the diminished value of the process is the fact that large amounts of expensive reagents are tied up for prohibitive times.

Much of this disadvantage would be overcome if it were possible to accelerate the rate of transfer of copper from an aqueous leach liquor to the ion exchange agent and its reverse, the stripping of copper from ion exchange agent into an acid electrolyte. This objective is achieved by the present invention through which the rate of extraction of copper from an acid solution by the specified copper extractants, LIX 64, LIX 64N and LIX 70, is enormously accelerated by the addition of small quantities of an $\alpha$-halo carboxylic acid or a thioglycolic acid or an oxidation product of a thioglycolic acid, the latter three components being referred to hereinafter as copper extraction accelerating agents.

SUMMARY OF THE INVENTION

The invention relates to the use of the copper extraction acceleration agents as additives to the 2-hydroxy benzophenoximes represented by the trade name products LIX 64, LIX 64N and LIX 70 sold by General Mills, Inc., to greatly increase the rate at which these latter products extract copper when used as ion exchange extractants to recover copper from acid solution. It comprises a method for recovering copper values from acidic aqueous solutions by contacting the solution with a water-immiscible organic phase having a density different from that of the aqueous phase comprised of an organic solvent having dissolved therein as an active extractant a 2-hydroxy benzophenoxime or mixtures thereof with one or more of the extraction accelerating agents. The invention includes the composition comprised of 2-hydroxy benzophenoximes and the copper extraction accelerating agents.

DETAILED DESCRIPTION OF THE INVENTION 2-hydroxy benzophenoximes operative for the invention include those disclosed in U.S. Pat. No. 3,428,449 issued to Ronald F. Swanson on Feb. 18, 1969. These compounds are ion exchange extractants for copper values in acid solutions. Individual compounds or mixtures thereof may be used. Methods for making these compounds are disclosed in the same patent. As disclosed in the above patent, 2-hydroxy benzophenoximes have the basic structure,

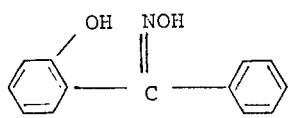

and are tailored with substituents to provide the required solubility in suitable organic solvents. The extractants include 2-hydroxy benzophenoximes in which the substituents are alkyl radicals, ethylenically unsaturated aliphatic radicals and alkyl or ethylenically unsaturated aliphatic ether radicals.

The preferred 2-hydroxy benzophenoximes are those represented by the formula:

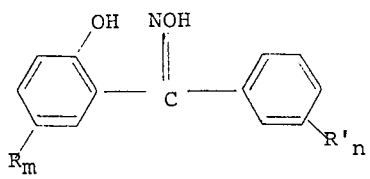

in which R and R' may be individually alike or different and are saturated aliphatic groups, ethylenically unsaturated aliphatic groups or saturated or ethylenically unsaturated ether groups (i.e. —OR'') and m and n are 0, 1, 2, 3 or 4 with the proviso that m and n are not both 0. The total number of carbon atoms in $R_m$ and $R'_n$ is from 3–25. R and R' contain 1 to 25 carbon atoms when saturated aliphatic and 3 to 25 carbon atoms when they are ethylenically unsaturated groups. Preferably, the position ortho to the phenolic OH substituted carbon atom is unsubstituted and also preferably the positions ortho to the oxime carbon atom on the other aromatic nucleus are unsubstituted. Branched chain saturated aliphatic hydrocarbon substituents are preferred. Compounds of the above type useful in the present invention include the following:

2-hydroxy-3'-methyl-5-ethylbenzophenoxime
2-hydroxy-5-(1,1-dimethylpropyl)-benzophenoxime
2-hydroxy-5-(1,1-dimethylethyl)-benzophenoxime
2-hydroxy-5-octylbenzophenoxime
2-hydroxy-5-nonyl-benzophenoxime
2-hydroxy-5-dodecyl-benzophenoxime
2-hydroxy-2',4'-dimethyl-5-octylbenzophenoxime
2-hydroxy-2',3',5'-trimethyl-5-octylbenzophenoxime
2-hydroxy-3,5-dinonylbenzophenoxime
2-hydroxy-4'-(1,1-dimethylethyl)-5-(2-pentyl)-benzophenoxime
2-hydroxy-4'-(1,1-dimethylethyl)-5-(2-butyl)-benzophenoxime
2-hydroxy-4-dodecyloxybenzophenoxime
2-hydroxy-4'-(1,1-dimethylethyl)-5-methylbenzophenoxime
2-hydroxy-4',5-bis-(1,1-dimethylethyl)benzophenoxime As indicated from the above representative compounds, various alkyl groups can be used as R and R'. And as set forth above, such groups may be branched or straight chain. Various ethylenically unsaturated groups can also be used as R and R' and the same may be branched or straight chain. Representative of such groups are pentenyl, hexenyl, octenyl, decenyl, dodecenyl, octadecenyl and the like. It is preferred that such groups contain less than about 2 double bonds and more preferably a single double bond. The R'' portion of the ether groups can be the saturated and ethylenically unsaturated aliphatic groups as described above. The R'' portion of the said ether groups is preferably an alkyl group. In addition, the saturated, ethylenically unsaturated and ether groups may contain inert substituents such as halogen, ester, amide, and the like. Likewise, the aromatic nuclei can contain inert substituents. By inert is meant that the said constituents do not affect the solubility, stabiliity or extraction efficiency of the compounds to any significant extent.

The benzophenoximes, which may be used in the present invention, are those which have sufficient solubility in one or more of the solvents disclosed below or mixtures thereof to make about a 2% solution and which are essentially insoluble or immiscible with water. At the same time, the benzophenoxime should form a complex with the metal, such as copper, which complex, likewise, is soluble in the organic solvent to at least the extent of about 2% by weight. These characteristics are achieved by having alkyl, ethylenically unsaturated aliphatic or ether substituents as described on either ring. It is necessary to have substituents which total at least 3 carbon atoms. This minimum may be obtained by means of a total of 3 methyl groups distributed on either one or on the two rings, by means of a methyl and an ethyl group, by means of a propyl group, etc. Usually it is prefered not to have more than 25 carbon atoms total in the substituents since these substituents contribute to the molecular weight of the oxime without improving operability. Large substituents, therefore, increase the amount of oxime for a given copper loading capacity. In general, the branched chain alkyl substituents effect a greater degree of solubility of the reagent and of the copper complex and, accordingly, these are preferred.

The 2-hydroxy benzophenoximes are suitable as a copper ion exchange extractant component of the mixed ion exchange reagent of the present invention which includes at least one of the copper extraction accelerating agents as the other component. Aliphatic substituted thioglycolic acids and oxidation products thereof, and α-halo substituted aliphatic carboxylic acids are used as representative members of the extraction accelerating agents to illustrate the invention.

The thioglycolic acids which are operative as copper extracting accelerators for the LIX compounds are represented by the following formula:

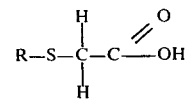

in which R is an aliphatic group, aryl or an araliphatic group.

Representative of the above compounds which are operative

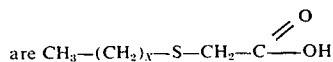

wherein X is 7–20,

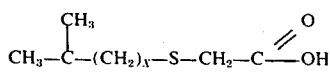

wherein X is 7-20,

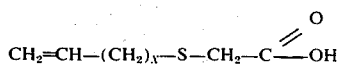

wherein X is 7-20,

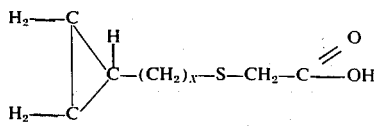

wherein X is 2-17,

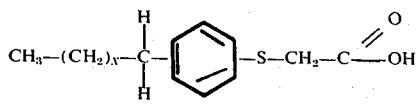

wherein X is 5-17,

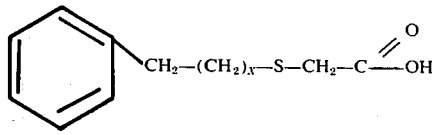

where X is 2-19,

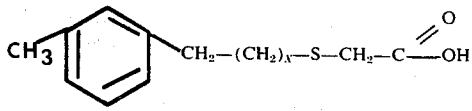

where X is 5-20,

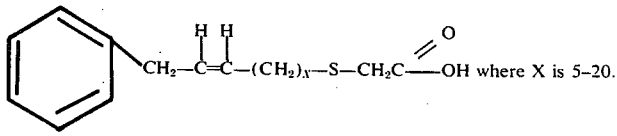 where X is 5-20.

Operative oxidation products of the thioglycolic acids are the above compounds in which the sulfur atom has one or two oxygen atoms attached to it. In the first stage oxidation one oxygen atom is attached to the sulfur atom and in the second stage oxidation two atoms of oxygen are attached to the sulfur atom.

The preferred thioglycolic acids are S-tert-octyl thioglycolic acid and S-tert-dodecyl thioglycolic acid, referred to herein as $C_3$ and $C_4$, respectively. The preferred oxidation products are the sulfoxides and sulfones of $C_3$ and $C_4$.

It is believed that the activity of the S-alkyl thioglycolic acids and their oxidation products rests upon three features: First, the significantly higher ionization constants ($K_a$) which increase from about $1-2 \times 10^{-4}$ for the former to $1-2 \times 10^{-3}$ for the fully oxidized alkyl sulfonyl acetic acids, as compared with $K_a$ of about $1-2 \times 10^{-5}$ for simple carboxylic acids; secondly, the contribution of the available electrons on the sulfur atom in the fully reduced and in the sulfoxide (e.g. partially oxidized analogs), with their potential for weakly chelating the copper ions; and finally, the enhanced acidity of the hydrogens on the alpha carbon atom as compared with those on simple aliphatic carboxylic acids. This acidity again increases as one progresses from the fully reduced (S-alkyl thioglycolic acid) through the alkyl sulfinyl- and thence to the alkyl sulfonyl-acetic acids. Although these substances have only meager ability to extract copper from acidic aqueous solutions of the pH ranges disclosed herein, they nevertheless are apparently capable of rapidly forming weak copper complexes which serve to transfer the $Cu^{++}$ from the aqueous to the organic phase, where a stronger interaction with, and transfer to, the hydroxy phenoxime occurs with concomitant regeneration of the transfer accelerating agent.

The α-halo substituted carboxylic acids which may be used as copper extraction accelerating agents for the 2-hydroxy benzophenoximes are represented by the formula:

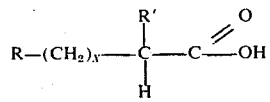

wherein R represents an aliphatic, aryl or an araliphatic group, R' is a halogen atom, and X is a number from 7-20.

Compounds of the above type which are operative are:

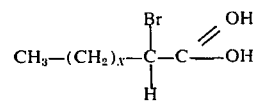

where X is 7-20,

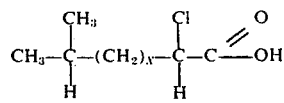

where X is 7-20,

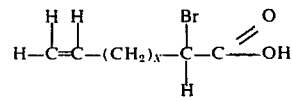

wherein X is 7-20,

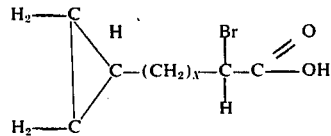

where X is 7-20,

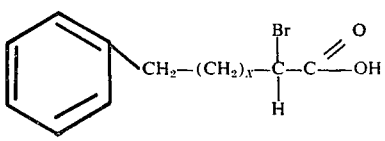

where X is 7-20,

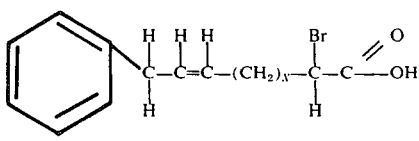

where X is 7-20,

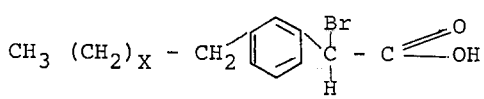

where X is 7-20.

The preferred α-halo substituted carboxylic acid is α-bromo lauric acid referred to hereinafter as $C_2$. A process for the recovery of copper using this compound alone is disclosed in U.S. Pat. 3,251,646 with times from three minutes to one hour being reported for significant recoveries.

A problem in the extraction of copper is that the leach solutions of its ores contain significant amounts of iron and the extractant used must not extract prohibitive amounts of iron to contaminate the copper extracted. It has been found that the extractant mixtures of this invention are satisfactory in this respect.

The water-immiscible organic solvents in which the extractant mixture is dissolved to form the organic phase are the conventional ones, such as, aliphatic hydrocarbon solvents including petroleum derived liquid hydrocarbons, either straight chain or branched, such as, kerosene, fuel oil, etc. Various aromatic solvents or chlorinated aliphatic solvents may be used, such as benzene, toluene, xylene, carbon tetrachloride, perchloroethylene and others. The solvent must be substantially waterimmiscible, capable of dissolving the extraction reagent, and must not interfere with the function of the reagent in extracting the metal values from acid solution. A suitable solvent is one sold commercially by Humble Oil and Refining Company under the trademark "Isopar L". It is a fractionated isoparaffinic hydrocarbon with a mid-boiling point of approximately 380°F. Another suitable solvent is an aliphatic naphtha sold by Amsco Division of Union Oil Company of California under the trade name "175 Solvent", and is referred to herein as "Amsco 175". Also found suitable are hexane, and a hexanetype solvent sold by Humble Oil and Refining Company under the trademark "Isopar C".

The benxophenoxime component of the organic extractant mixture should have a solubility of at least 2% by weight in the hydrocarbon solvent in the organic phase and is insoluble or immiscible with water.

The aqueous phase from which the desired metal is extracted is ordinarily the acid leach solution resulting from leaching of an ore. During the extraction phase the mixed extractant becomes loaded with copper or other desired metal.

It is well known that LIX 64, LIX 64N and LIX 70 exhibit a selectivity for copper over other metals at pH values below about 4. The most efficient organic to aqueous ratio can be arrived at in accordance with procedures well known in the art. After separation of the loaded organic phase from the aqueous phase, copper is stripped from it with a mineral acid, such as sulfuric, in a stripping circuit.

The liquid ion exchange process may be performed by continuous countercurrent or batch methods.

The extraction with the extractant mixture is performed at a pH in the acid range. Leach solutions of copper ores ordinarily have a pH range from about 1.7 to 3.0.

The invention is illustrated by the following comparative examples, and the graphs of FIGS. 1 and 2 illustrating the effect of the additives $C_3$ and $C_4$ on loading and stripping rates, respectively, of copper with LIX 64N.

Example 4 was performed as a blank to evaluate the $C_3$ and $C_4$ reagents as copper extractants.

In all of the other examples the LIX 64N content of the organic phase was 10 volume percent based on the volume of the organic solvent, and the volume ratio of additive to LIX 64N was 1 to 10. The solution from which the copper was extracted in the examples had a pH of 2.

Examples 1 and 5 were performed using what is referred to as a "drop" test. This test comprises introducing the organic phase drop by drop at the bottom of a container holding the aqueous phase. The amount of copper transferred to the organic phase is measured as milligrams of copper per square meter of organic phase transferred per second. The stripping test of Example 1 was performed in a baffled beaker with a rotating mixing element. All other examples, extracting and stripping, including those on which the graphs of FIGS. 1 and 2 are based, were performed using a pipe extractor as disclosed in U.S. Pat. Ser. No. 175,948 filed by Wayne C. Hazen in the U.S. Pat. Office on Aug. 30, 1971 entitled "Solvent Extraction Method and Apparatus." In accordance with this procedure the aqueous and organic phases are flowed together through the mixing section containing baffled mixing elements in a closed pipe at a velocity to mix the phases in the shortest time without the formation of too many small bubbles with the dispersion formed being transferred to a settling area where the aqueous and organic phases separate by gravity. The pipe extractor used for the examples was 6.5 feet long × ½ inch in diameter and contained 105 mixing elements.

The example which follows using the drop test procedure was performed to illustrate the increase in extraction rate of copper by LIX 64N obtained by the addition of various amounts of $C_2$ to LIX 64N. The organic solvents for the extractant were Isopar L and Amsco 175. The aqueous phase was a copper sulfate solution containing 2.0 g/l of copper.

EXAMPLE 1

| Reagent $C_2$ Addition Vol. % | Diluent | Copper Transfer Rate Mg Cu/m²/sec. |
|---|---|---|
| 0 | Isopar L | 4.9 |
| 0.25 | " | 11.0 |
| 0.5 | " | 15 |
| 1.0 | " | 18 |

-continued

| Reagent $C_2$ Addition Vol. % | Diluent | Copper Transfer Rate Mg Cu/m²/sec. |
|---|---|---|
| 0 | Amsco 175 | 4.0 |
| 1.0 | " | 14 |
| 2.0 | " | 15 |
| 5.0 | " | 24 |

It will be noted from the test results that copper extraction rate is doubled with the addition of 0.25 volume percent of $C_2$, is tripled with the addition of more than 0.5 volume percent of $C_2$ and at 5 volume percent of $C_2$ it is increased six times.

The following example was performed, again to illustrate the increase in the extraction rate effected by the addition of the reagent $C_2$ to LIX 64N with the ion exchange process being performed in the pipe extractor described hereinbefore. The solvent for LIX 64N and the $C_2$ additive in this example was hexane. The aqueous phase was a copper sulfate solution containing 3.1 g/l of copper, 1.7 g/l $Fe^{+3}$ and 2.9 g/l $Fe^{+2}$. The organic and aqueous phases were flowed through the mixer section of the pipe extractor at a velocity of 0.9-1 ft.sec. at a temperature of 23°C. Two passes of the phases through the mixer were made with the following results.

EXAMPLE 2

| Reagent $C_2$ Addition Vol. % | Pass No. | Contact Time Sec. | G/L Cu Organic | G/L Cu Raffinate | Organic Cu Loading % Of Equilibrium |
|---|---|---|---|---|---|
| None | 1 | 6.5 | .51 | 2.20 | 32 |
| | 2 | 6.5 | .98 | 1.69 | 61 |
| | Equilibrium | 20 min. | 1.62 | .74 | |
| 1% | 1 | 6.7 | 1.14 | 1.45 | 71 |
| | 2 | 7.0 | 1.49 | 1.03 | 93 |
| | Equilibrium | 20 min. | 1.60 | .75 | |

It will be observed from the above example that over twice as much copper was extracted in the first pass with the $C_2$ additive present than was extracted without the additive in the same period of time. In the two passes more than one and one-half times as much copper was extracted with the additive than without the additive.

The following example was performed to show the effect of the presence of the additive $C_2$ on the rate of stripping copper from LIX 64N. The solvent used for LIX 64N and the additive was Amsco 175. The stripping solution was a 3N $H_2SO_4$ solution containing 20 g/l of copper as copper sulfate. The propeller in the baffled beaker in which the process was performed was rotated at 900 RPM. An organic to aqueous ratio of 3:1 was used. The experiment was performed at a temperature of 30°C with samplings being taken at various intervals.

EXAMPLE 3

| Reagent $C_2$ Addition Vol. % | Contact Time Min. | Organic Assay, G/L Cu Loaded | Stripped | % Cu Stripped |
|---|---|---|---|---|
| None | 0 | 2.22 | | |
| " | 0.25 | | 1.50 | 32 |
| " | 0.5 | | 1.45 | 35 |
| " | 1.0 | | 1.32 | 41 |
| " | 2.0 | | 1.00 | 55 |
| " | 5.0 | | .44 | 80 |
| " | 10.0 | | .17 | 92 |
| " | 20.0 | | .15 | 93 |
| 1.0 | 0 | 2.58 | | |
| " | 0.25 | | .84 | 67 |
| " | 0.5 | | .61 | 76 |
| " | 1.0 | | .35 | 86 |
| " | 2.0 | | .18 | 93 |
| " | 5.0 | | .14 | 95 |
| " | 10.0 | | .14 | 95 |
| " | 20.0 | | .14 | 95 |

The results show that with the contact time of 0.25 minutes the amount of copper stripped in the presence of one volume percent of the $C_2$ additive is doubled over that stripped without the additive in the same time. With the same volume content of the $C_2$ additive more copper is stripped in two minutes than was stripped in five minutes with no additive present. The time to reach equilibrium concentration is decreased by a factor of at least 4 when the $C_2$ additive is present.

The following example was performed to evaluate the reagents $C_3$ and $C_4$ as copper extractants.

EXAMPLE 4

Conditions:
Organics 5 volume % reagent C–3 or C–4 in kerosene (Amsco 175), preconditioned with 3N $H_2SO_4$ then 20 g/l $Na_2SO_4$
Aqueous Synthetic sulfate solution containing 2.06 g/l Cu, and 2 g/l $Na_2SO_4$
Contact O/A ratio 1/1
Contact time 5 minutes at pH
Aqueous pH Adjusted with 1N NaOH
Temperature 23°C Results:

| Organic | Aqueous pH | Assay, g/l Cu Organic | Raffinate | % Cu Extracted | Cu Distribution Coefficient K O/A |
|---|---|---|---|---|---|
| C-3 | 1.0 | 0.002 | 2.04 | 0.1 | 0.001 |
| | 2.0 | 0.026 | 2.04 | 1.3 | 0.013 |
| C-4 | 1.0 | 0.002 | 2.02 | 0.1 | 0.001 |
| | 2.0 | 0.018 | 2.02 | 0.9 | 0.009 |

The results show that the $C_3$ and $C_4$ reagents do not appreciably extract copper under the conditions set forth.

The following example was performed to illustrate the effect of the reagents $C_3$ and $C_4$ on the copper extraction rate of LIX 64N, the experiment being performed by the drop test described hereinabove. The solvent for the LIX 64N and the $C_3$ and $C_4$ additives was Amsco 175. The aqueous phase, i.e., the copper sulfate solution, contained 1.9 g/l copper, 2 g/l $Fe^{+3}$ and 2 g/l sodium sulfate.

EXAMPLE 5

| Reagent Addition | | | Copper Transfer Rate Mg Cu/M²/Sec. |
|---|---|---|---|
| None | | | 4 |
| 0.5 | Vol. % | $C_3$ | 20 |
| 1.0 | " | " | 30 |
| 2.0 | " | " | 41 |
| 0.5 | " | $C_4$ | 13 |
| 1.0 | " | " | 15 |
| 2.0 | " | " | 12 |

The results show that, in the same times, as compared to copper extraction with no additive present, extraction rates were increased by factors of 5, 7.5, and 10 with, respectively, 0.5, 1, and 2 volume percent of $C_3$ present. Likewise, extraction rates were increased by factors of 3, 3.8, and 3, respectively, with the use of 0.5, 1 and 2 volume percent of $C_4$ additive.

The following example was performed, again, to illustrate the effect on copper extraction rate of the presence of the reagent $C_3$. The solvent for LIX 64N and the reagent was Amsco 175. The aqueous phase comprised a copper sulfate solution containing 3.1 g/l of copper, 1.7 g/l $Fe^{+3}$ and 2.9 g/l $Fe^{+2}$. A pipe extractor was used. A flow velocity of 0.9 ft/sec of the liquids was used. An organic to aqueous ratio of 1.5:1 and a temperature of 23°C were used.

EXAMPLE 6

| Reagent $C_3$ Addition Vol. % | Pass No. | Contact Time Sec. | Assay, G/L Cu Organic | Raffinate | Organic Cu Loading % Of Equilibrium |
|---|---|---|---|---|---|
| None | 1 | 6.9 | .55 | 2.20 | 35 |
| | 2 | 6.8 | .85 | 1.67 | 55 |
| | Equilibrium | 20 Min. | 1.54 | .73 | |
| 1% | 1 | 7.0 | 1.24 | 1.15 | 83 |
| | 2 | 6.8 | 1.39 | .85 | 93 |
| | Equilibrium | 20 Min. | 1.50 | .76 | |

The example shows that with essentially the same contact time, the amount of copper extracted using 1 volume percent of $C_3$ was almost doubled in two passes over that extracted with no additive present.

EXAMPLE 7

| Reagent Addition | Pass No. | Contact Time Sec. | Assay, G/L Organic Cu | Fe | Raffinate Cu |
|---|---|---|---|---|---|
| None | 1 | 6.5 | .57 | .003 | 2.38 |
| | 2 | " | .88 | .005 | 1.88 |
| | 3 | " | 1.16 | .006 | 1.59 |
| 1% $C_3$ | 1 | 5.9 | 1.22 | .004 | 1.19 |
| | 2 | 6.5 | 1.49 | .007 | .89 |
| | 3 | 5.9 | 1.60 | .009 | .81 |
| 1% $C_4$ | 1 | 5.9 | 1.07 | .003 | 1.42 |
| | 2 | 6.5 | 1.43 | .006 | .98 |
| | 3 | 5.9 | 1.59 | .008 | .85 |

The example shows that using essentially the same contact time, the amount of copper extracted was increased by a factor of 1.7 by the addition of 1 volume percent of reagent $C_3$. Likewise, copper extraction increased by a factor of 1.6 in the same time by the addition of 1 volume percent of $C_4$ additive. The example also illustrates that the presence of either of the reagents $C_3$ or $C_4$ does not increase iron extraction to any appreciable extent.

The following example was performed to illustrate the effect of $C_3$ and $C_4$ additives on the rate of stripping copper from LIX 64N. The organic solvent used was Isopar C. The strip solution was a 3N sulfuric acid solution containing 20 g/l copper as copper sulfate. A pipe extractor was used. The velocity of liquids through the mixing section of the pipe extractor was 1 ft/sec. An organic to aqueous ratio of 1:1 and a temperature of 23°C were used.

EXAMPLE 8

| Reagent Addition | Pass No. | Organic Assay, G/L Loaded Cu | Fe | Stripped Cu | Fe | % Stripped Cu | Fe | Cu Stripping Rate G/L Cu/Sec. |
|---|---|---|---|---|---|---|---|---|
| None | 0 | 1.16 | .006 | | | | | |
| | 1 | | | .63 | .003 | 46 | 50 | .082 |
| | 2 | | | .35 | .0008 | 70 | 87 | .043 |
| | 3 | | | .18 | .0008 | 84 | 87 | .026 |
| 1% $C_3$ | 0 | 1.60 | .009 | | | | | |
| | 1 | | | .37 | .003 | 77 | 67 | .19 |
| | 2 | | | .087 | .0006 | 95 | 93 | .044 |
| | 3 | | | .058 | .0004 | 96 | 96 | .004 |
| 1% $C_4$ | 0 | 1.59 | .008 | | | | | |
| | 1 | | | .62 | .003 | 61 | 63 | .15 |
| | 2 | | | .23 | .0009 | 86 | 89 | .060 |
| | 3 | | | .11 | .0005 | 93 | 94 | .018 |

The following example using the pipe extractor was performed to show the effect of the presence of the reagents $C_3$ and $C_4$ on the copper loading rate of LIX 64N. The organic solvent for the LIX 64N and additives $C_3$ or $C_4$ was Isopar C. The aqueous phase comprised copper sulfate solution containing 3.1 g/l of copper, 1.7 g/l of $Fe^{+3}$ and 2.9 g/l $Fe^{+2}$. A flow velocity of 0.9 ft/sec was used. Three passes were used.

The example shows that in the same contact time, during the first pass with one volume percent of $C_3$ present, the copper stripping rate was increased by a factor 2.3, and with one volume percent of $C_4$ present, stripping rates were increased by a factor of 1.8. Comparable results were obtained in the second and third passes.

The final example was performed using as additives the oxidation products of $C_4$, one of the products being a partial oxidation product and the other a complete oxidation product. The oxidation products were made in the conventional manner by oxidation with hydrogen peroxide in the presence of glacial acetic acid, one-half the stoichiometric amount of hydrogen peroxide for complete oxidation being used for the partial oxidation and the complete stoichiometric amount being used for complete oxidation. The sulfoxide was produced by partial oxidation and the sulfone by complete oxidation, and these additives are so identified in the following table of results. They are represented by the following chemical formulas:

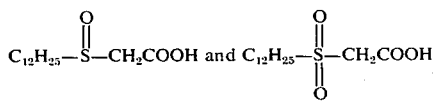

Using the drop test procedure described above in separate tests of the sulfoxide and sulfone, 10 volume percent LIX 64N and one volume percent additive were mixed in Amsco 175 as the solvent and contacted with an aqueous solution containing 2.0 g/l Cu, 3 g/l $Fe^{+2}$, 2 g/l $Fe^{+3}$, and 2 g/l $Na_2SO_4$ with the following results which include comparative results obtained on a control using one volume percent $C_4$ additive.

EXAMPLE 9

| Test Additive | Control (1% $C_4$) | No. 1 (Sulfoxide) | No. 2 (Sulfone) |
|---|---|---|---|
| Contact Time, Sec. | 6.9 | 6.7 | 6.5 |
| Drop Size, cm³/Drop | .041 | .029 | .026 |
| Surf.Area, cm²/Drop | .58 | .46 | .42 |
| Temp., °C | 23 | 25 | 23 |
| Organic Assay G/L Cu | .14 | .22 | .22 |
| Transfer Rate Mg Cu/m²/sec. | 14.4 | 20.8 | 21.0 |

The results show that the sulfoxide and sulfone are even better copper extraction accelerators for LIX 64N than $C_4$. In substantially the same time 45 percent more copper was exextracted with LIX 64N containing these additives than was extracted by LIX 64N containing the $C_4$ additive alone.

Reference is now made to the graph of FIG. 1 depicting comparative results of experiments performed in extracting copper with LIX 64N with the addition of the $C_3$ and $C_4$ reagents and without the addition of any reagents. One volume percent of the reagents $C_3$ and $C_4$ based on the organic solvent was used. This amounts to a volume ratio of 1:10 of additive to LIX 64N. The organic solvent was Isopar C. A pipe extractor was used. The aqueous phase was a copper sulfate solution containing 3 g/l copper, 2 g/l $Fe^{+3}$ and 3 g/l $Fe^{+2}$. The solution had a pH of 2.0 at the start. A flow velocity of 1 ft/sec was used. An organic to aqueous ratio of 1.5/1 and a temperature of 21° – 23° were used. Three passes were made. Essentially the same contact time for all passes was used.

The graph of FIG. 1 shows that copper extraction rate with 1 volume percent of $C_3$ present increased by a factor of about 3 on the first pass, 1.6 on the second pass and 1.3 on the third pass. Likewise, with one volume percent of $C_4$ present, the rate of copper extraction increased by a factor of about 2.3 on the first pass, 1.5 on the second pass, and 1.3 on the third pass.

The graph of FIG. 2 shows graphically the accelerated stripping rate achieved by the addition of $C_3$ and $C_4$ additives to LIX 64N. A pipe extractor was used. One percent of the additive based on the amount of solvent was used. The organic solvent was Isopar C. A flow velocity of 1 ft/sec was used. The tests were performed at 22°C. The strip solution was a 3N sulfuric acid solution containing 20 g/l of copper as Cu $SO_4$.

It will be noted from the graph of FIG. 2 that the stripping rate was accelerated by factors of 2 and 1.6 by the presence of $C_3$ and $C_4$ additives, respectively.

The volume percent of the $C_2$, $C_3$ and $C_4$ type additives based on the amount of LIX 64N reagent (2-hydroxy benzophenoxime) can vary from 0.1 to 100 percent, with a preferred volume percent of additive to reagent being about 1 to about 20. The contact time of the mixed extractants (2-hydroxy benzophenoximes like LIX 64N plus additive) with the aqueous phase for extraction, irrespective of the type mixing equipment used, can vary from a few seconds up to about one minute with satisfactory results being obtained. This is in contrast to a contact time of at least two minutes required for satisfactory copper extraction with the LIX compounds alone in commercial operations. The contact time of the stripping agent with the mixed extractant loaded with copper is from a few seconds up to about one minute for satisfactory stripping. Again, this is in contrast to a time of about two minutes contact time for satisfactory stripping of copper from the LIX reagents without the additives.

The chief advantages of the process are that the addition of the copper extraction and stripping acceleration additives increases the copper extraction rate of the LIX reagents up to a factor of at least 3 and the rate at which copper can be stripped from them by a factor of up to at least 2. The result is a decided economic improvement in that much less capital equipment is required, and the amount of expensive agent which is tied up and the time it is tied up are drastically reduced from a comparative economic standpoint.

What is claimed is:

1. A process for recovering copper values from an aqueous medium comprising contacting the aqueous medium with a water-immiscible organic solvent having dissolved therein an extractant comprising:
a 2-hydroxy benzophenoxime having a solubility of at least 2% by weight in the organic solvent and as a copper extraction accelerating agent for the 2-hydroxy benzophenoxime a compound selected from the group consisting of thioglycolic acids and oxidation products of thioglycolic acids.

2. The process of claim 1 in which the thioglycolic acid has the formula:

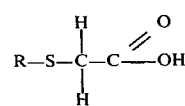

wherein R is an aliphatic, aryl, or an araliphatic group, and the oxidation product of the thioglycolic acids has the formula:

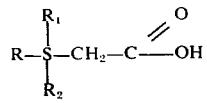

wherein R is an aliphatic, aryl or araliphatic group, $R_1$ is oxygen and $R_2$ is oxygen or an electron pair.

3. The process of claim 2 wherein the aliphatic group in all structural formulas has from 7–20 carbon atoms.

4. The process of claim 1 in which the aqueous medium is contacted with the extractant for a time up to about one minute.

5. The process of claim 1 in which the accelerating agent is present in an amount from about 0.1–100 volume percent of the 2-hydroxy benzophenoxime.

6. The process of claim 1 in which the 2-hydroxy benzophenoxime is a member selected from the group consisting of alkyl substituted, ethylenically unsaturated aliphatic substituted and alkyl or ethylenically unsaturated aliphatic ether substituted 2-hydroxy benzophenoximes.

7. The process of claim 6 in which the 2-hydroxy benzophenoxime has the formula:

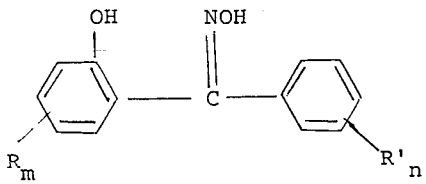

in which R and R' may be individually alike or different and are saturated aliphatic groups of 1–25 carbon atoms, ethylenically unsaturated aliphatic groups of 3–25 carbon atoms or —OR" where R" is a saturated or ethylenically unsaturated aliphatic group as defined, $m$ and $n$ are 0, 1, 2, 3 or 4 with the proviso that both are not 0 and the total number of carbon atoms in $R_m$ and $R'_n$ is from 3–25.

8. The process of claim 7 in which R of the 2-hydroxy benxophenoxime is an ethylenically unsaturated group.

9. The process of claim 7 in which R' of the 2-hydroxy benzophenoxime is an unsubstituted branched chain aliphatic hydrocarbon group.

10. The process of claim 7 in which R of the 2-hydroxy benzophenoxime is an unsubstituted branched chain hydrocarbon group.

11. The process of claim 7 in which at least one R group of the 2-hydroxy benzophenoxime is in the 5 position.

12. The process of claim 1 in which the thioglycolic acid is a member selected from the group consisting of octyl thioglycolic acid and its oxidation products.

13. The process of claim 1 in which the thioglycolic acid is a member selected from the group consisting of dodecyl thioglycolic acid and its oxidation products.

14. In the process for recovering copper values from an aqueous medium which comprises contacting the aqueous medium with an extractant comprising a 2-hydroxy benzophenoxime followed by stripping the copper from the loaded extractant to recover the copper, the improvement which comprises stripping the copper from the extractant in the presence of a copper stripping accelerating agent for the 2-hydroxy benzophenoxime comprising a member selected from the group consisting of a thioglycolic acid or an oxidation product of a thioglycolic acid.

15. The process improvement of claim 14 in which the stripping is performed in a time of up to about one minute.

16. A process for recovering copper values from an aqueous medium comprising contacting the aqueous medium with a water-immiscible organic solvent having dissolved therein an extractant comprising:
a 2-hydroxy benzophenoxime having a solubility of at least 2% by weight in the organic solvent and as a copper extraction accelerating agent for the 2-hydroxy benzophenoxime an organic compound containing the group

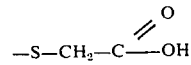

in which a sulfur atom is separated from a carboxyl group only by one lower alkyl group.

17. A process for recovering copper values from an aqueous medium comprising contacting the aqueous medium with a water-immiscible organic solvent having dissolved therein an extractant comprising:
a substituted hydroxy benzophenoxime having a solubility of at least 2% by weight in the organic solvent and as a copper extraction accelerating agent for the substituted hydroxy benzophenoxime a compound selected from the group consisting of thioglycolic acids and oxidation products of thioglycolic acids.

* * * * *